2 Sheets—Sheet 2.
P. P. MAST & S. W. MARTIN.
Lawn Mower.
No. 238,412. Patented March 1, 1881.
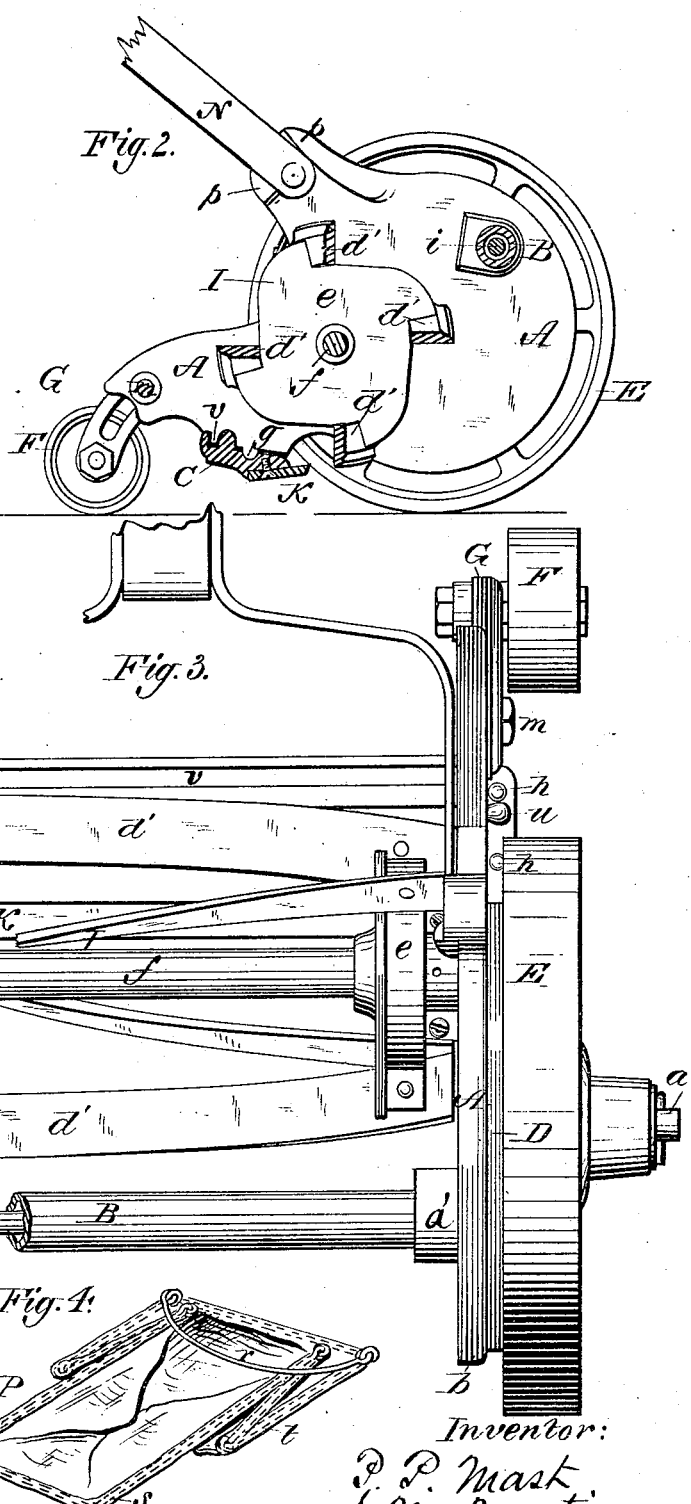

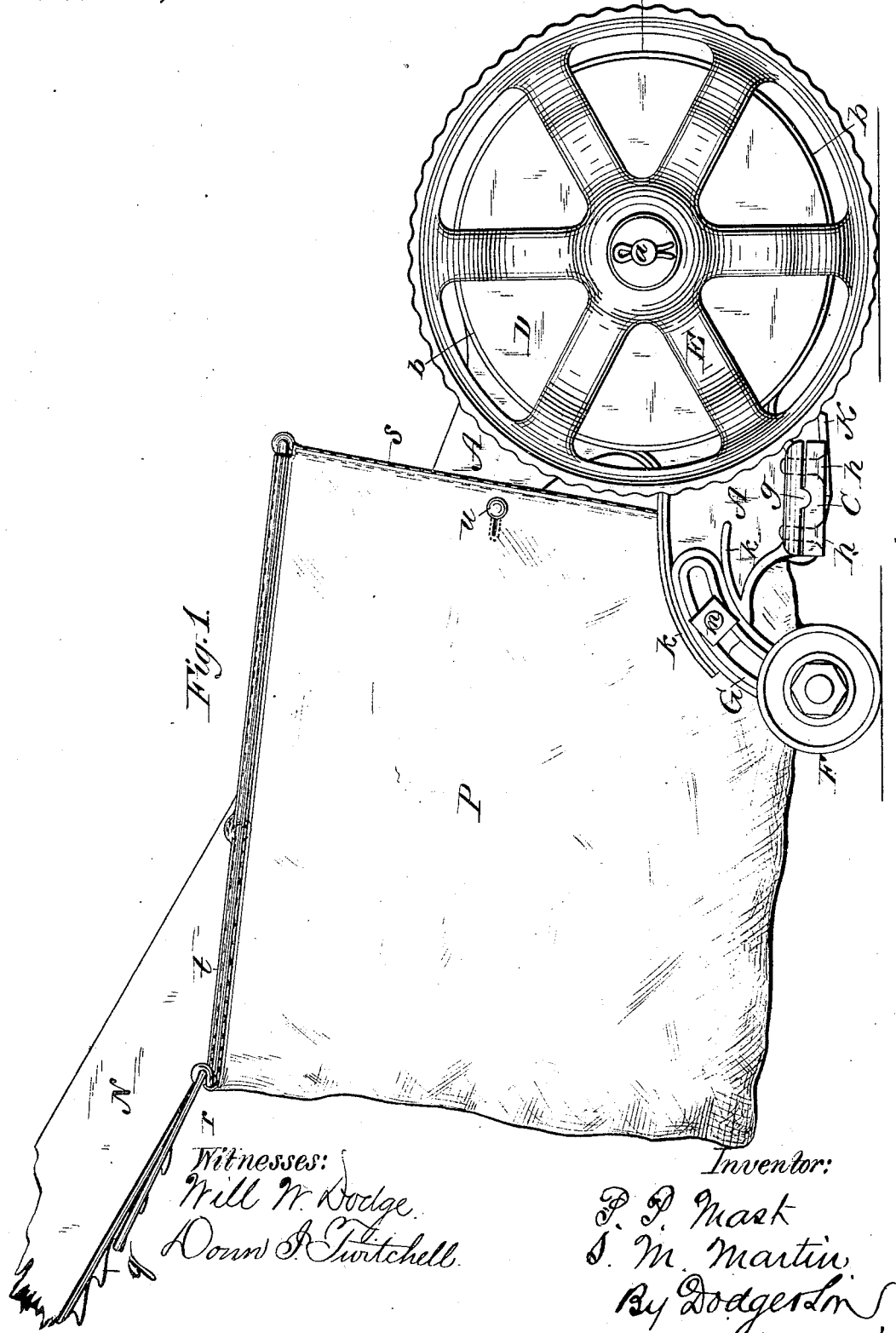

UNITED STATES PATENT OFFICE.

PHINEAS P. MAST AND SAMUEL W. MARTIN, OF SPRINGFIELD, OHIO.

LAWN-MOWER.

SPECIFICATION forming part of Letters Patent No. 238,412, dated March 1, 1881.

Application filed January 2, 1879.

*To all whom it may concern:*

Be it known that we, PHINEAS P. MAST and SAMUEL W. MARTIN, of Springfield, in the county of Clarke and State of Ohio, have invented certain Improvements in Lawn-Mowers, of which the following is a specification.

This invention relates to that class of lawn-mowers in which spiral revolving knives are arranged to act in conjunction with a fixed blade; and the invention consists in a flexible grass-receptacle, and in a peculiar construction of the mower, whereby the attachment and use of the same are facilitated.

Figure 1 represents a side elevation of the machine; Fig. 2, a vertical longitudinal section of the same; Fig. 3, a front elevation of the same, with one side shown in section through the center of the driving-wheel; Fig. 4, a view of the grass-receiver detached and folded.

The mower being constructed with special reference to the attachment of the grass-receiver, we will first describe the machine and then the construction and method of applying the grass-receiver.

In order to collect all the grass it is important that the receptacle, besides extending close down to the stationary blade, shall also extend from end to end of the cutter, and that there shall be nothing between the cutter-head and the mouth of the grass-receptacle to intercept the grass in its passage to the latter. We therefore construct the frame as shown in Figs. 2 and 3, in which—

A A represent the side plates of the machine, cast with a central outside spindle, *a*, to serve each as the axle of a large gear-wheel, D, and ground-wheel E, the latter being dished, as shown in Fig. 2, in order that the gear-wheel D may extend into its face or side, and thus render the machine narrow and compact.

Each gear-wheel D is furnished with a central hub or boss, in which are mounted sliding clutch-pins *c*, urged outward by springs *d*, the pins being arranged those of each pair out of line with each other diametrically of the hub, in order that they may engage alternately with the teeth or shoulders of the ground-wheels.

The rear side of the frame is sustained by two small rollers, F, (for which, however, a long roller may be substituted,) each turning upon an axle carried by an arc-shaped arm, G, arranged to be moved for adjustment between ribs *k*, of like curvature, formed on the side plates, A, and to be clamped at any desired point by bolts or screws *m*.

I represents the rotary cutter-head, consisting of a series of spiral blades, *d'*, secured to end plates or disks, *e*, which are mounted on a transverse shaft, *f*, the ends of which are extended through the side plates and bearings thereon, and provided with pinions J, which gear into and are driven by the wheels D, which also serve to conceal and protect the pinions, as shown.

The blades of the rotary head act in conjunction with a fixed transverse blade, K, which is attached to and sustained by a rocking plate, C, the ends of which are seated on studs *g* on the lower edge of the frame and secured by screws *h* passing through the plate into the frame, as shown.

By tightening the screws at one side of the plate and loosening those at the other the plate may be given a rocking or rolling adjustment, so as to elevate or depress the blade K and bring it in the proper relation to the rotary blade.

It will be noticed that the plate or bar which sustains the fixed blade also serves as one of the cross-braces of the frame, thus avoiding the use of extra parts and leaving an unobstructed outlet for the grass.

The upper brace, B, of the frame consists of a piece of gas-pipe or tubing of the proper length, seated at its ends in sockets *a'* cast in the side plates, and of a rod or bolt, *i*, passed through the center of the tubing and out through the side plates, and tightened up by means of a nut or nuts on its ends, so as to force the plates firmly against the ends of the tube, as shown in Fig. 3. By seating the tube in the sockets and giving them a long bearing and applying the rod, as shown, the frame is given great rigidity and strength, and prevented from racking or twisting out of shape. In the use of machines of this class it is desirable that they shall retain and carry the cut grass, in order that it may be deposited at a single point instead of being scattered over the lawn; and it is equally desirable and important that the receiver used for this purpose shall be capable of ready attachment and detachment, and that it shall not render the machine bulky and cumbersome during shipment or storage. We therefore provide the machine with a receiver, P, which is not only capable of being readily applied and removed, but which may be folded at will into a very small compass, in which condition it adds nothing to the size of the machine. This receiver is shown in its applied position in Fig. 1 and in its folded state in Fig. 4. It consists of a cloth or canvass bag, open at the front and top, and sustained by means of a front frame, s, and a top frame, t, both made of wire and sewed into the edges. The frame s has its lower edge seated in a groove, v, in the knife-supporting plate, and bears at its sides against studs u on the sides of the main frame, while the frame t, which is jointed to frame s, is provided with a bail, r, which is engaged with a toothed bar, q, secured to the handle of the machine, as clearly represented in Fig. 1. The above arrangement retains the bag or receiver in an open or expanded position, in such relation to the machine that the grass is thrown directly into it. The disengagement of the bail releases the receiver and admits of its being readily removed to discharge the grass.

When detached the receiver may be folded into a very compact form, and the machine packed in the same compass that it would occupy without the receiver. If desired, the receiver may be modified in form and in the construction of its frame, and the body or bag, made of rigid plates, hinged or jointed together in such manner as to be capable of folding into a compact form.

Having thus described the invention, what is claimed is—

1. The flexible bag or grass-receiver, provided with a folding or jointed distending frame, substantially as shown and described.

2. The lawn-mower having the side studs, the grooved cross-bar, and rack q, in combination with the grass-receiving bag and its frame.

3. The combination of the lawn-mower and the flexible or folding grass-receiver, provided with means for holding the latter in a distended condition, substantially as described and shown.

PHINEAS P. MAST.
SAMUEL W. MARTIN.

Witnesses:
J. D. HURD,
J. B. CHRISTIE.